United States Patent
Lee et al.

(10) Patent No.: US 6,911,755 B2
(45) Date of Patent: Jun. 28, 2005

(54) CAPSTAN-MOTOR ASSEMBLY FOR MAGNETIC RECORDING/READING APPARATUS

(75) Inventors: Hwan-seung Lee, Yongin (KR); Young-yun Seol, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/779,709

(22) Filed: Feb. 18, 2004

(65) Prior Publication Data

US 2004/0245874 A1 Dec. 9, 2004

(30) Foreign Application Priority Data

Jun. 9, 2003 (KR) .................................. 10-2003-0036913

(51) Int. Cl.[7] .............................................. H02K 5/00
(52) U.S. Cl. ........................ 310/91; 310/90; 310/67 R
(58) Field of Search .............................. 310/67 R, 68 R, 310/89–91, 216, 254

(56) References Cited

U.S. PATENT DOCUMENTS

| | | | |
|---|---|---|---|
| 5,578,883 A | * | 11/1996 | Sakashita et al. ............. 310/91 |
| 6,049,147 A | * | 4/2000 | Sanada et al. ................ 310/42 |
| 6,339,273 B1 | * | 1/2002 | Higuchi ........................ 310/91 |
| 6,703,738 B2 | * | 3/2004 | Yoshikawa et al. ........... 310/91 |

* cited by examiner

Primary Examiner—Thanh Lam
(74) Attorney, Agent, or Firm—Roylance, Abrams, Berdo & Goodman, L.L.P.

(57) ABSTRACT

A capstan-motor assembly for a magnetic recording/reading apparatus comprises a bearing holder fixed to a motor frame on a main deck for rotatably supporting a shaft; a stator core coupled to the bearing holder, and on which a coil is wound; a rotor frame coupled to the shaft so as to be rotated together with the shaft, and in which a magnet corresponding to the coil is supported; and a PCB substrate disposed between the stator core and the motor frame, and electrically connected with the coil. The bearing holder has a soldering boss soldered to the PCB substrate and/or the stator core so as to protrude to outer surfaces thereof, thereby reducing components needed to affix PCB substrate and stator core to the bearing holder.

21 Claims, 5 Drawing Sheets

CAPSTAN-MOTOR ASSEMBLY FOR MAGNETIC RECORDING/READING APPARATUS

CROSS-REFERENCE TO RELATED APPLICATION

This application claims the benefit of Korean Application No. 2003-36913, filed Jun. 9, 2003, in the Korean Intellectual Property Office, the disclosure of which is incorporated herein by reference.

BACKGROUND OF THE INVENTION

1. Field of the Invention

The present invention relates to a capstan-motor assembly for a magnetic recording/reading apparatus.

2. Description of the Related Art

Generally, a magnetic recording/reading apparatus such as a video cassette tape recorder (VCR), a camcorder, etc., records information on a recording medium such as a magnetic tape and/or reads the recorded information.

The magnetic recording/reading apparatus typically comprises a main deck on which a head drum is rotatably mounted, a sub deck disposed to be reciprocated with respect to the main deck, a pair of reel tables rotatably disposed at the sub deck so as to drive a tape reel of a tape cassette, and a capstan-motor assembly for supplying a driving force for driving the reel table.

The power of the capstan-motor assembly is transferred through desired power transmission means to the reel table.

FIG. 1 shows an example of the capstan-motor assembly. The capstan-motor assembly 30 has a motor frame 31 disposed to be apart from a main deck. A PCB substrate 32 is provided at a lower side of the motor frame 31, and a bearing holder 33 is fixed to the motor frame 31 by means of a screw. At the bearing holder 33, a shaft 34 is supported by a bearing 35.

At an outer circumference of the bearing holder 33, a stator core 37 on which a coil 36 is wound is fixed by a screw. Further, the stator core 37 is connected through a holder pin 38 to the PCB substrate 32. Therefore, the PCB substrate 32 can be fixedly disposed to be relatively positioned with respect to the bearing holder 33 and the motor frame 31 by the holder pin 38. A lower end of the holder pin 38 is fitted into a coupling hole formed at the stator core 37, and an upper end of the holder pin 38 is fitted into a coupling hole formed at the PCB substrate 32. A lead pin 39 is disposed at the holder pin 38 so as to be connected with the PCB substrate 32. On an upper end of the lead pin 39, a lead line of the coil 36 is connected to the PCB substrate 32 by means of a solder connection or other electrical connection method.

A rotor frame 41 and a pulley 42 are rotatably coupled to a lower end of the shaft. A magnet 43 for generating a rotational force by an interaction with the coil 36 is disposed at the rotor frame 41.

In the capstan-motor assembly as described above, when assembling the PCB substrate 32, the stator core 37 and the bearing holder 33, the need for additional components like the holder pin 38 and the plurality of screws, etc., is problematic in that a construction of the capstan-motor assembly becomes complicated. For example, it is difficult to assemble the components, productivity is lowered, and cost is increased.

SUMMARY OF THE INVENTION

In accordance with an aspect of the present invention, a magnetic recording/reading apparatus comprises: (1) a bearing holder configured for connection to a motor frame to rotatably support a shaft; (2) a stator core on which a coil is wound to interact with a magnet on a rotor frame to generate rotational force to rotate the shaft; and (3) a circuit board. The bearing holder, the stator core and the circuit board each comprise at least one hole aligned with respect to each other and configured to receive a soldering boss device therethrough for coupling together as an assembly. The soldering boss device comprises first and second soldering boss portions protruding from the corresponding hole at the top and bottom, respectively, of the assembly to facilitate the coupling thereof.

In accordance with another aspect of the present invention, a plurality of the holes are provided in each of the bearing holder, the stator core and the circuit board for each receiving respective soldering boss devices. The plurality of holes in the bearing holder are arranged radially about the shaft.

In accordance with yet another aspect of the present invention, the bearing holder comprises another hole configured to receive a screw threaded into the motor frame of the magnetic reading/recording apparatus. Further, the bearing holder and the motor frame can each comprise a plurality of the holes for receiving respective screws therethrough.

In accordance with still yet another aspect of the present invention, the bearing holder, the stator core and the circuit board can each comprise a plurality of the holes for receiving respective soldering boss devices therethrough. The plurality of the holes in the bearing holder for receiving respective soldering boss devices can be arranged radially with respect to each other about the shaft. Further, the bearing holder can have three such holes for receiving respective soldering boss devices that are spaced 120° radially with respect to each other.

In accordance with another aspect of the present invention, the plurality of holes in the bearing holder for receiving respective screws are interspersed with the plurality of holes in the bearing holder for receiving respective soldering boss devices. For example, the plurality of holes in the bearing holder for receiving respective screws can be alternated with the plurality of holes in the bearing holder for receiving respective soldering boss devices. In addition, there can be three holes in the bearing holder for receiving respective soldering boss devices that are spaced 120° radially with respect to each other and each of the holes in the bearing holder for receiving respective screws.

In accordance with an aspect of the present invention, the bearing holder is composed of a plastic synthetic material.

In accordance with another aspect of the present invention, the soldering boss device is soldered in the hole, and the solder is spread widely over the corresponding hole at the top and bottom, respectively, of the assembly. Further, the coil is electrically connected to the circuit board by a lead line.

In accordance with yet another aspect of the present invention, the starter core comprises a plurality of ribs extending from an inner circumferential portion thereof, and the plurality of holes in the stator core are formed in corresponding ribs.

In accordance with an aspect of the present invention, a method of assembling a capstan-motor assembly for a magnetic reading/recording apparatus, the capstan-motor assembly having a bearing holder configured for connection to a motor frame to rotatably support a shaft, a stator core on which a coil is wound to interact with a magnet on a motor frame to generate rotational force to rotate the shaft, and a circuit board, comprises the steps of: (1) providing a hole in each of the bearing holder, the stator core and the circuit board configured for receiving a soldering boss device configured; (2) assembling the bearing holder, the stator core and the circuit board to align their respective holes; and (3) inserting a soldering boss device through the aligned holes.

In accordance with yet another aspect of the present invention, the method further comprises the steps of: soldering the soldering boss device in the aligned holes; and spreading the solder widely over the respective hole at the top and bottom of the assembly.

In accordance with still yet another aspect of the present invention, a plurality of holes can be provided in each of the bearing holder, the stator core and the circuit board for alignment together and receiving respective soldering boss devices. The plurality of holes in the bearing holder can be arranged radially about the shaft. Further, the bearing holder can have three of the holes arranged 120° apart from each other.

In accordance with yet another aspect of the present invention, the method further comprises the step of providing a plurality of holes in the motor frame and the bearing holder that are aligned and configured for receiving respective screws therethrough.

In accordance with still yet another aspect of the present invention, the method can further comprise the step of interspersing the plurality of holes in the bearing holder for receiving respective screws with the plurality of holes in the bearing holder for receiving respective soldering boss devices.

BRIEF DESCRIPTION OF THE DRAWINGS

The above objects and other advantages of the present invention will become more apparent by describing in detail preferred embodiments thereof with reference to the attached drawings in which.

DETAILED DESCRIPTION OF THE PREFERRED EMBODIMENTS

Now, preferred embodiments of the present invention will be described in detail with reference to the annexed drawings.

Figure 1:
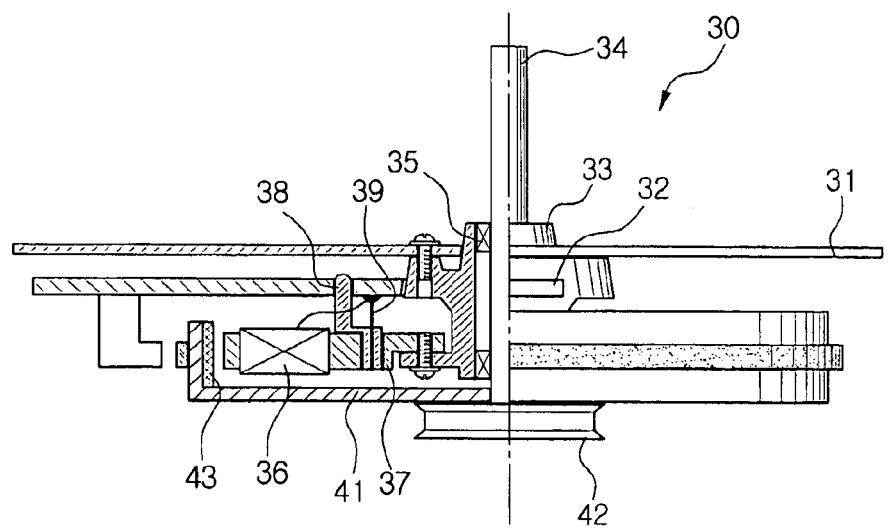
FIG. 1 is a cross-sectional view of a conventional capstan-motor assembly.
Figure 2:
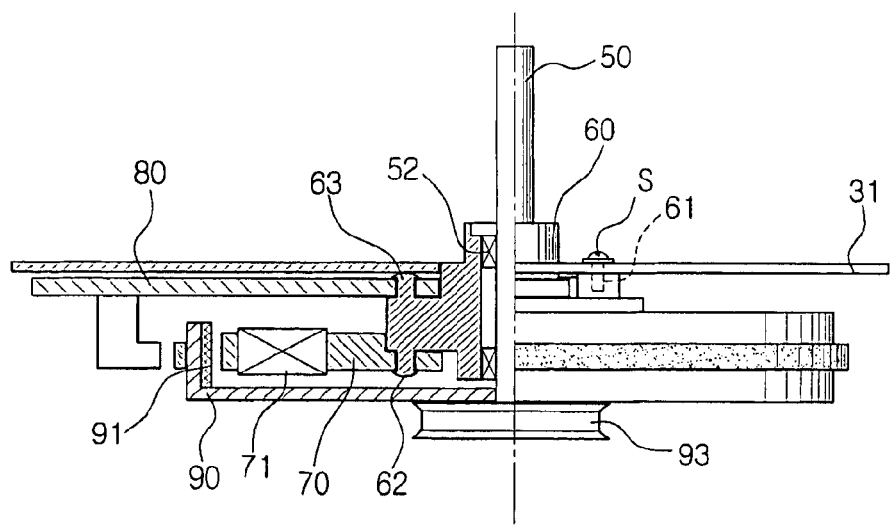
FIG. 2 is a cross-sectional view of a capstan-motor assembly for a magnetic recording/reading apparatus according to an embodiment of the present invention.

Referring to FIG. 2, a capstan-motor assembly for a magnetic recording/reading apparatus according to an embodiment of the present invention comprises a bearing holder 60 for rotatably supporting a shaft 50, a stator core 70 coupled to the bearing holder 60, a PCB substrate 80 coupled to the bearing holder 60 and a rotor frame 90 coupled to a lower end of the shaft 50.

The shaft 50 is supported by means of a bearing 52 so as to be rotatable with respect to the bearing holder 60.

Figure 3:
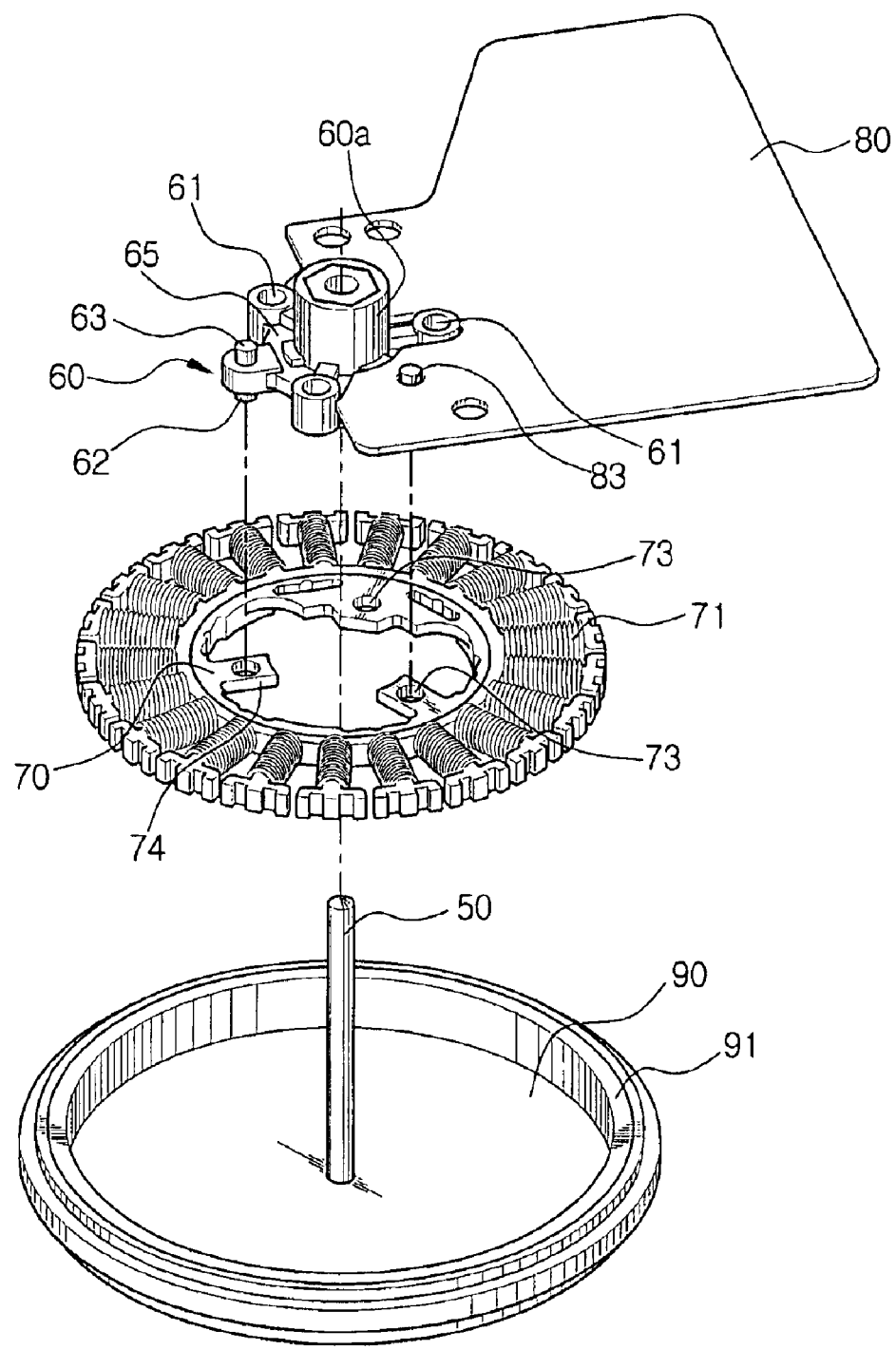
FIG. 3 is an exploded perspective view of a magnetic recording/reading apparatus according to an embodiment of the present invention.

The bearing holder 60 is fixed to a motor frame 31 disposed to be apart from an upper side of a deck of the magnetic recording/reading apparatus. In other words, the bearing holder 60 is fixed to the motor frame 31 by a screw S. To this end, at an upper portion of the bearing holder 60, there is formed a threaded hole 61 in which the screw is coupled. Referring to FIG. 3, a plurality of these threaded holes 61 are symmetrically formed around a shaft coupling portion 60a, in which the shaft 50 is coupled, to be equally arranged at a desired angle. In the illustrated embodiment, there are provided three threaded holes 61 by way of an example.

The stator core 70 is coupled to a lower portion of the bearing holder 60. A coil 71 is wound on the stator core 70. As shown in FIG. 3, the stator core 70 is provided with a plurality of soldering holes 73 formed at a desired position to facilitate coupling to the bearing holder 60. A plurality of ribs 74 are integrally formed with the stator core 70 so as to be extended from an inner circumferential portion of the stator core 70. Each of the soldering holes 73 is formed at a corresponding rib 74. The soldering holes 73 are symmetrically formed at a desired angle with the shaft coupling portion 60a in the center.

The PCB substrate 80 is supported by the bearing holder 60 so as to be positioned at a lower side of the motor frame 31. A lead line of the coil 71 is connected to the PCB substrate 80 by means of soldering or other conventional electrical connection. The PCB substrate 80 is coupled to the upper portion of the bearing holder 60 in the same way as the stator core 70. To this end, the PCB substrate 80 has a soldering hole 83. It is preferred to provide multiple soldering holes 83.

Meanwhile, the rotor frame 90 is coupled to the lower end of the shaft 50 so as to be rotated together with the shaft 50. At the rotor frame 90, there is disposed a magnet 91 corresponding to the coil 71. The magnet 91 generates a rotational force by interaction with the coil 71. The rotational force rotates the rotor frame 91 and the shaft 50. Further, a pulley 93 is coupled to the rotor frame 90 so as to be rotated together with the rotor frame 90. Power for driving a tape reel of a tape cassette in the magnetic recording/reading apparatus is transferred by the pulley 93.

Figure 4:
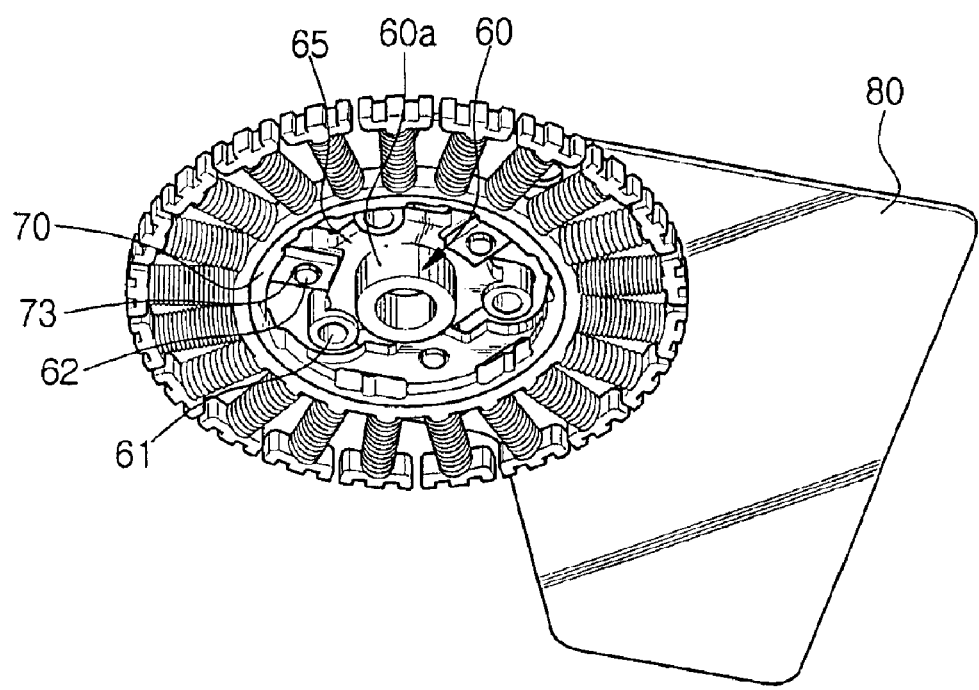
FIGS. 4 and 5 are perspective views showing the stator core, bearing holder and PCB substrate assembly of FIG. 3.

Herein, the bearing holder 60 will be described in detail. The bearing holder 60 has a soldering boss which is soldered to the stator core 70 and/or the PCB substrate 80. In the embodiment of the present invention, the stator core 70 and the PCB substrate 80 are each preferably soldered to the bearing holder 60 in a plurality of locations. To this end, the soldering boss is divided into a first soldering boss 62 protruded downward and a second soldering boss 63 protruded upward. As shown in FIG. 4, the first soldering boss 62 is soldered by a desired soldering machine, while being fitted into the soldering hole 73 of the stator core so as to pass through the soldering hole 73, whereby the first soldering boss 62 is soldered to a lower surface of the stator core 70. Therefore, the stator core 70 can be fixed without any separate coupling member such as the screw or holder pin, etc.

Figure 5:
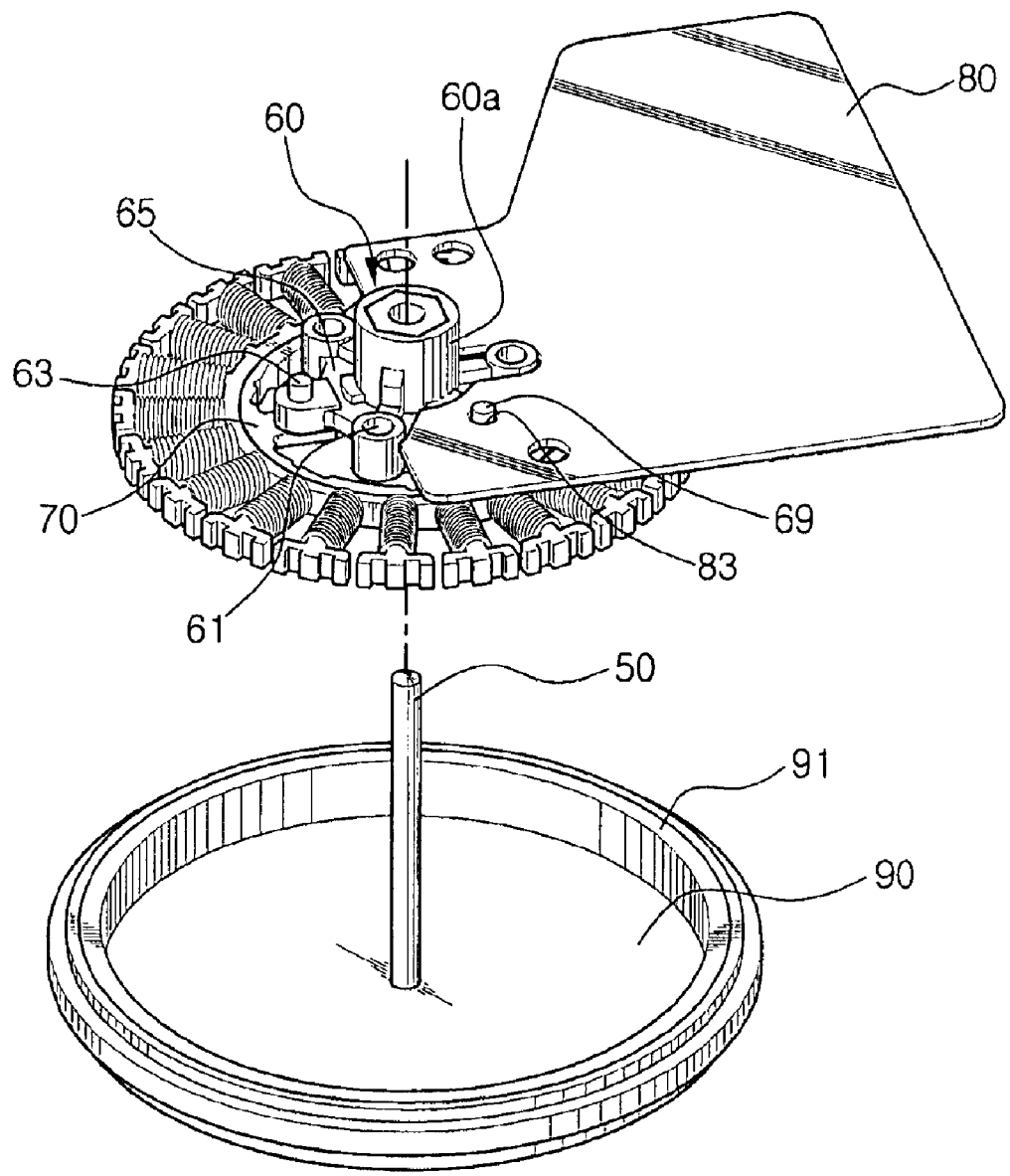

Furthermore, the second soldering boss 63 is soldered, while being fitted into the soldering hole 83 of the PCB substrate 80 so as to pass through the soldering hole 83. Therefore, the second soldering boss 63 is soldered so as to be closely contacted with an upper surface of the PCB substrate 80, such that the PCB substrate 80 is closely contacted with the bearing holder 60. Therefore, in this case, the PCB substrate 80 can be also fixed to the bearing holder 60 in a simple way without any separate coupling member. As shown in FIG. 5, there are provided three second soldering bosses 63. However, only two soldering holes 83 are provided at the PCB substrate 80. Therefore, two out of the three second soldering bosses 63 are selectively used according to an assembling position of the PCB substrate 80.

Meanwhile, the first and second soldering bosses 62 and 63 are provided at the upper and lower surfaces of the bearing holder 60 so as to be opposite to each other. The plurality of first and second soldering bosses 62 and 63 are provided so as to be protruded to the upper and lower surface of the bearing holder 60. Further, the first and second soldering bosses 62 and 63 are alternately arranged with the threaded hole 61 and also are symmetrical around the shaft coupling portion 60a at regular intervals. That is, each of the soldering bosses 62 and 63 is arranged at an angle of 120°, and the threaded holes 61 provided between them 62 and 63 are also arranged at the angle of 120°. And, each of the soldering bosses 62 and 63 and the threaded holes 61 are integrally formed with the rib 65 formed around the shaft coupling portion 60a.

Figure 6:
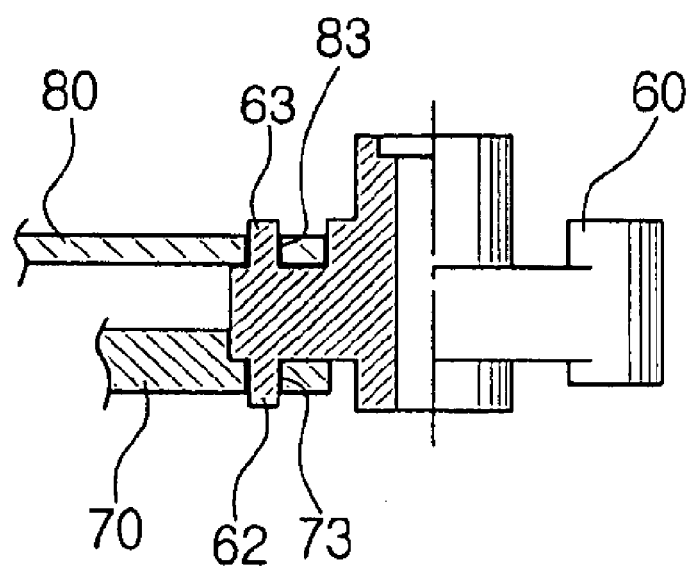
FIG. 6 is a view showing the PCB substrate and the stator core coupled to the bearing holder of FIG. 3 prior to being soldered.

In addition, as shown in FIG. 6, the protruded height of each soldering boss 62, 63 is longer than a depth of each of the soldering holes 73 and 83. Therefore, after the soldering boss 62, 63 is inserted into the soldering hole 73, 83, a desired portion of the soldering boss 62, 63 is protruded, thereby increasing a coupling force when performing the soldering process. Accordingly, after the soldering boss 62, 63 is soldered, as shown in FIG. 2, the solder is widely spread to cover each of the soldering holes 73, 83. Preferably, the bearing holder 60 as described above is made of a plastic synthetic material which can be deformed by external heat and also rapidly cooled.

According to the capstan-motor assembly for the magnetic recording/reading apparatus, as described above, the PCB substrate and the stator core can be fixed to the bearing holder by the soldering process. Therefore, since separate coupling members are not needed, the number of components is decreased and also a construction is simplified.

While the present invention has been described in detail, it should be understood that various changes, substitutions and alterations can be made hereto without departing from the spirit and scope of the invention as defined by the appended claims.

What is claimed is:

1. A magnetic recording/reading apparatus comprising:
   a bearing holder configured for connection to a motor frame to rotatably support a shaft;
   a stator core on which a coil is wound to interact with a magnet on a rotor frame to generate rotational force to rotate the shaft; and
   a circuit board;
   wherein the bearing holder, the stator core and the circuit board each comprise at least one hole aligned with respect to each other and configured to receive a soldering boss device therethrough for coupling together as an assembly, the soldering boss device comprising first and second soldering boss portions protruding from the corresponding hole at the top and bottom, respectively, of the assembly to facilitate the coupling thereof.

2. A magnetic reading/recording apparatus as claimed in claim 1, further comprising a plurality of the holes in each of the bearing holder, the stator core and the circuit board for each receiving respective soldering boss devices, the plurality of holes in the bearing holder being arranged radially about the shaft.

3. A magnetic reading/recording apparatus as claimed in claim 1, wherein the bearing holder comprises another hole configured to receive a screw threaded into the motor frame of the magnetic reading/recording apparatus.

4. A magnetic reading/recording apparatus as claimed in claim 3, wherein the bearing holder and the motor frame each comprise a plurality of the holes, the plurality of holes receiving respective screws therethrough.

5. A magnetic reading/recording apparatus as claimed in claim 4, wherein the bearing holder, the stator core and the circuit board each comprise a plurality of the holes for receiving respective soldering boss devices therethrough.

6. A magnetic reading/recording apparatus as claimed in claim 5, wherein the plurality of the holes in the bearing holder for receiving respective soldering boss devices are arranged radially with respect to each other about the shaft.

7. A magnetic reading/recording apparatus as claim in claim 6, wherein the plurality of holes in bearing holder for receiving respective soldering boss devices consists of three such holes spaced 120° radially with respect to each other.

8. A magnetic reading/recording apparatus as claimed in claim 6, wherein the plurality of holes in the bearing holder for receiving respective screws are interspersed with the plurality of holes in the bearing holder for receiving respective soldering boss devices.

9. A magnetic reading/recording apparatus as claimed in claim 8, wherein the plurality of holes in the bearing holder for receiving respective screws are alternated with the plurality of holes in the bearing holder for receiving respective soldering boss devices.

10. A magnetic reading/recording apparatus as claimed in claim 9, wherein each of the holes in the bearing holder for receiving respective soldering boss devices consists of three such holes spaced 120° radially with respect to each other and each of the holes in the bearing holder for receiving respective screws.

11. A magnetic reading/recording apparatus as claimed in claim 1, wherein the bearing holder is composed of a plastic synthetic material.

12. A magnetic reading/recording apparatus as claimed in claim 1, wherein the soldering boss device is soldered in the hole, and the solder is spread widely over the corresponding hole at the top and bottom, respectively, of the assembly.

13. A magnetic reading/recording apparatus as claimed in claim 1, wherein the coil is electrically connected to the circuit board by a lead line.

14. A magnetic reading/recording apparatus as claimed in claim 2, wherein the starter core comprises a plurality of ribs extending from an inner circumferential portion thereof, the plurality of holes in the stator core being formed in corresponding ribs.

15. A method of assembling a capstan-motor assembly for a magnetic reading/recording apparatus, the capstan-motor assembly having a bearing holder configured for connection to a motor frame to rotatably support a shaft, a stator core on which a coil is wound to interact with a magnet on a motor frame to generate rotational force to rotate the shaft, and a circuit board, comprises the steps of:
   providing a hole in each of the bearing holder, the stator core and the circuit board configured for receiving a soldering boss device configured;
   assembling the bearing holder, the stator core and the circuit board to align their respective holes; and
   inserting a soldering boss device through the aligned holes.

16. A method as claimed in claim 15, further comprising the steps of:

soldering the soldering boss device in the aligned holes; and spreading the solder widely over the respective hole at the top and bottom of the assembly.

17. A method as claimed in claim 15, further comprising the step of providing a plurality of holes in each of the bearing holder, the stator core and the circuit board for alignment together and receiving respective soldering boss devices.

18. A method as claimed in claim 17, further comprising the step of arranging the plurality of holes in the bearing holder radially about the shaft.

19. A method as claimed in claim 18, wherein the bearing holder has three of the holes and the arranging step comprises the step of arranging the three holes 120° apart from each other.

20. A method as claimed in claim 18, further comprising the step of providing a plurality of holes in the motor frame and the bearing holder that are aligned and configured for receiving respective screws therethrough.

21. A method as claimed in claim 20, further comprising the step of interspersing the plurality of holes in the bearing holder for receiving respective screws with the plurality of holes in the bearing holder for receiving respective soldering boss devices.

* * * * *